(12) United States Patent
Fox et al.

(10) Patent No.: US 7,883,071 B2
(45) Date of Patent: Feb. 8, 2011

(54) METHODS AND APPARATUS FOR ISOLATION SYSTEM

(75) Inventors: Gary L. Fox, Oro Valley, AZ (US);
Nicholas E. Kosinski, Tucson, AZ (US);
Shawn B. Harline, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 131 days.

(21) Appl. No.: 12/266,159

(22) Filed: Nov. 6, 2008

(65) Prior Publication Data

US 2009/0292396 A1    Nov. 26, 2009

Related U.S. Application Data

(60) Provisional application No. 61/055,127, filed on May 21, 2008.

(51) Int. Cl.
*F16M 13/00*    (2006.01)
(52) U.S. Cl. ............... 248/560; 248/603; 248/605; 248/618
(58) Field of Classification Search .......... 248/560, 248/603, 605, 608, 618; 267/136, 140.13; 188/378
See application file for complete search history.

(56) References Cited

U.S. PATENT DOCUMENTS

| | | | |
|---|---|---|---|
| 3,947,007 A | 3/1976 | Pelat | |
| 4,161,304 A | 7/1979 | Brenner et al. | |
| 4,199,128 A | 4/1980 | van den Boom et al. | |
| 4,262,886 A | 4/1981 | Le Salver et al. | |
| 4,306,253 A | 12/1981 | Nakamura | |
| 4,309,107 A | 1/1982 | McNair et al. | |
| 4,380,847 A | 4/1983 | Tajima | |
| 4,424,960 A | 1/1984 | Dan et al. | |
| 4,551,765 A | 11/1985 | Meeder, Jr. | |
| 4,619,349 A | 10/1986 | Braun | |
| 4,651,980 A | 3/1987 | Morita et al. | |
| 4,681,293 A | 7/1987 | Cucci et al. | |
| 4,689,357 A | 8/1987 | Hongu et al. | |
| 4,739,962 A | 4/1988 | Morita et al. | |
| 4,877,225 A | 10/1989 | Noguchi et al. | |
| 4,893,799 A | 1/1990 | de Fontenay | |
| 5,029,823 A | 7/1991 | Hodgson et al. | |

(Continued)

FOREIGN PATENT DOCUMENTS

WO    WO-2009/142740 A1    11/2009

OTHER PUBLICATIONS

Gary L. Fox, Matrix Methods for the Analysis of Elastically Supported Isolation Systems, The Shock and Vibration Bulletin, Aug. 1976.

(Continued)

*Primary Examiner*—Ramon O Ramirez
(74) *Attorney, Agent, or Firm*—Schwegman, Lundberg & Woessner, P.A.

(57) ABSTRACT

Methods and apparatus for isolation system according to various aspects of the present invention comprise a plurality of elastic elements disposed in one or more planes between an equipment body and a mounting structure and are not symmetric about the center of gravity of the equipment body. The isolation system is configured to modally decouple vibration along one axis from other axes of vibration and provide an isoelastic mounting system in up to all six degrees of freedom.

26 Claims, 8 Drawing Sheets

U.S. PATENT DOCUMENTS

| | | |
|---|---|---|
| 5,116,030 A | 5/1992 | Nowak et al. |
| 5,118,068 A | 6/1992 | Noguchi |
| 5,227,929 A | 7/1993 | Comerford |
| 5,363,700 A | 11/1994 | Joly et al. |
| 5,390,949 A | 2/1995 | Naganathan et al. |
| 5,464,196 A | 11/1995 | Dankowski et al. |
| 5,721,457 A | 2/1998 | Sri-Jayantha et al. |
| 5,890,569 A | 4/1999 | Goepfert |
| 6,094,818 A | 8/2000 | Ogawa et al. |
| 6,199,840 B1 | 3/2001 | Yano |
| 6,419,213 B2 | 7/2002 | Murai |
| 6,517,062 B2 | 2/2003 | Kuwayama et al. |
| 6,578,682 B2 | 6/2003 | Braman et al. |
| 6,634,628 B2 | 10/2003 | Takashima et al. |
| 6,871,561 B2 | 3/2005 | Denice, Jr. et al. |
| 7,487,958 B2 * | 2/2009 | Wang .......................... 267/136 |

OTHER PUBLICATIONS

Qamar Hameed, et al., Effects of Environmental Conditions on Inertial Navigation System, Presented at 2004 International Bhurban Conference on Applied Science & Technology.

"International Application Serial No. PCT/US2009/003144, Search Report mailed Jul. 14, 2009", (2 pgs.).

"International Application Serial No. PCT/US2009/003144, Written Opinion mailed Jul. 14, 2009", (8 pgs.).

* cited by examiner $$\begin{bmatrix}
k_{11} & k_{12} & k_{13} & -k_{12}p_3 + k_{13}p_2 & k_{11}p_3 - k_{13}p_1 & -k_{11}p_2 + k_{12}p_1 \\
k_{21} & k_{22} & k_{23} & k_{22}p_3 + k_{23}p_2 & -k_{22}p_3 - k_{23}p_1 & -k_{21}p_2 + k_{22}p_1 \\
k_{31} & k_{32} & k_{33} & -k_{32}p_3 + k_{33}p_2 & k_{32}p_3 - k_{33}p_2 & -k_{31}p_2 + k_{32}p_1 \\
-k_{22}p_8 + k_{31}p_2 & -k_{22}p_3 + k_{32}p_2 & -k_{23}p_3 + k_{33}p_2 & k_{44} + k_{22}p_3^2 + k_{33}p_2^2 - k_{23}p_2p_3 - k_{32}p_3p_2 & k_{44} + k_{22}p_3^2 + k_{33}p_2^2 - k_{23}p_2p_3 - k_{32}p_3p_2 & k_{45} - k_{31}p_2^2 - k_{22}p_2p_3 + k_{21}p_2p_3 - k_{32}p_1p_3 \\
k_{11}p_3 - k_{31}p_1 & k_{12}p_3 - k_{32}p_1 & k_{13}p_3 - k_{33}p_1 & k_{54} - k_{22}p_3^2 - k_{33}p_2p_3 + k_{32}p_3p_1 + k_{13}p_2p_3 & k_{35} + k_{11}p_3^2 + k_{32}p_2^2 - k_{32}p_3p_1 - k_{13}p_1p_3 & k_{56} - k_{32}p_1^2 - k_{22}p_2p_3 + k_{31}p_2p_1 + k_{12}p_1p_3 \\
-k_{11}p_2 + k_{22}p_1 & -k_{22}p_2 + k_{22}p_1 & -k_{13}p_2 + k_{23}p_1 & k_{54} - k_{23}p_2^2 - k_{22}p_3p_3 + k_{23}p_1p_2 + k_{12}p_2p_3 & k_{55} - k_{23}p_1^2 - k_{11}p_2p_3 + k_{13}p_2p_1 + k_{21}p_2p_3 & k_{56} + k_{11}p_2^2 + k_{22}p_2^2 - k_{12}p_1p_2 - k_{21}p_2p_1
\end{bmatrix}$$

*Fig. 7*

METHODS AND APPARATUS FOR ISOLATION SYSTEM

CROSS-REFERENCES TO RELATED APPLICATIONS

This application claims the benefit of U.S. Provisional Patent Application No. 61/055,127, filed on May 21, 2008, and incorporates the disclosure of the application by reference.

BACKGROUND OF INVENTION

Shock and vibration isolation systems (SVIS) are frequently implemented in conjunction with a variety of equipment ranging from mechanical devices to electronics. An SVIS employs a plurality of elastic elements which support a body with the intent of controlling the shock and vibration transmitted to said body. In the context of isolating inertial measurement (IMU) equipment and the like, the SVIS generally disposes a plurality of elastic structures symmetrically located about the center of gravity of the equipment. In this configuration, the center of gravity of the equipment is coincident with the center of elasticity of the isolation system.

While such systems may mitigate the effects of phenomena such as shock and vibration, the location of elastic elements around the body may impose design constraints that reduce the utility of such systems. For example, in many retrofit applications, a commercial-off-the-shelf guidance unit may have dimensions incompatible with a symmetric SVIS. Specifically, the geometric constraints of the compartment into which the equipment is intended to be placed may not be compatible with the required isolator placements. As another example, the bulk of a symmetric SVIS may add weight to the overall system, inhibiting the weight of other components and limiting performance. Further, the complexity of a symmetric SVIS carries with it an increased likelihood of failure of the mounting mechanism and corresponding malfunction of the guidance unit.

SUMMARY OF THE INVENTION

In various representative aspects, the present invention provides methods and apparatus for a base mounted isolation system. A base mounted isolation system has the isolators lying in a plane, or in multiple planes, that are not symmetric with the center of gravity. In this configuration two important properties are achieved that have previously been achievable with a symmetric system. First the center of gravity is coincident with the elastic center of the SVIS. This configuration is known as modal decoupling; e.g. the X axis vibrational mode is decoupled from the Y and Z axis, and so on. Second, if the isolators system has the same stiffness in all axes, the SVIS is known as isoelastic, i.e., having the same natural frequency in all three translational directions. This characteristic reduces what is known as vibration rectification error in an IMU or other type of sensor. These characteristics are advantageous to mounting of all equipment in that the sway space is reduced since the rocking is minimized. It is also often desirable to have the same shock and vibration response in all axes, even if not a measurement device.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

FIG. 7 is a stiffness matrix for an odd number of elastic elements; and

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of techniques, methods, materials, and/or the like configured to perform the specified functions and achieve the various results. For example, the present invention may employ various coupling devices, e.g., bolts, screws, clips, adhesives, and the like, which may carry out a variety of functions. In addition, the present invention may be practiced in conjunction with any number of rate sensing instruments and electronic equipment and the system described is merely one exemplary application for the invention. Further, the present invention may employ any number of conventional techniques for securing an electronic device to a projectile, reducing vibration and/or shock related errors within an electronic device, and so forth.

Figure 1:
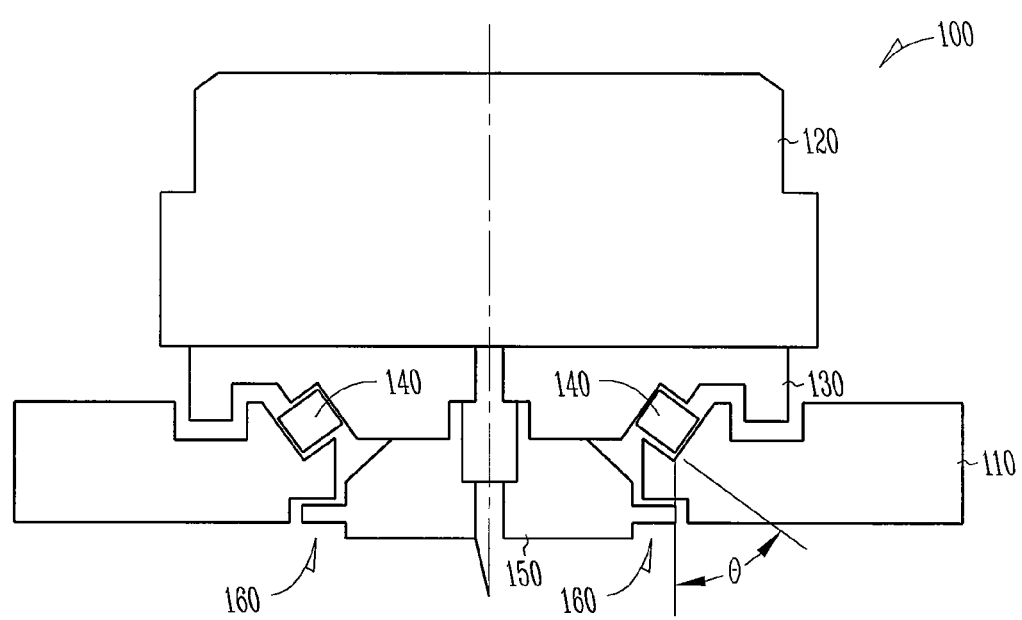
FIG. 1 representatively illustrates a cutaway side view of a body isolated by a base isolation system.

Various representative implementations of the present invention may be applied to any system for isolation of a body with regard to vibration, shock, and related phenomena. Certain representative implementations may include, for example: an isolator configured to reduce the errors associated with mechanical shock and vibration incident to a rate sensing instrument. Methods and apparatus for isolation may operate in conjunction with an isolation system 100. Referring to FIG. 1, one embodiment of the isolation system 100 comprises a mounting flange 110, an equipment body 120, and an adapter plate 130. The isolation system 100 may comprise any system for preventing unwanted vibrational interference such as elastic elements, fasteners, isolators configured to receive a body to be isolated, etc. The adapter plate 130 may be connected to the mounting flange 110 and the equipment body 120 by any method such as mechanical fasteners or an adhesive.

The isolation system 100 may be employed in various embodiments. For example, the equipment body 120 may comprise a rate sensing instrument such as an inertial guidance system. The mounting flange 110 may be configured to couple the equipment body 120 to a structure, such as a specified portion of a projectile, to reduce phenomena, such as shock and vibration from passing from the structure to the body 120. This configuration may be employed in an initial build of, for example, a guided projectile and/or may be employed in a retrofit application.

Existing systems frequently isolate a rate sensing instrument by colocation of the center of mass of the rate sensing instrument with the center of elasticity of the isolation system. Such systems may be described as globally symmetric; that is, they colocate the center of mass of the rate sensing instrument with the center of elasticity of the isolation system by surrounding the rate sensing instrument; the symmetry of the isolator locations and properties automatically result in such a system. In such systems, the elastic elements are located in multiple planes symmetric with respect to the rate sensing instrument.

In contrast, the present isolation system 100 of FIG. 1 may be configured to achieve the desired effect without relying completely on the symmetry of the mounting system. These are described as: (1) the interface between the adapter plate 130 and the equipment body 120 may be configured to substantially lie in a single plane; (2) the adapter plate 130 may be configured to provide a substantially uniform stiffness in all three translational degrees of freedom; and (3) the adapter plate 130 may be configured to respond to excitation from a specified direction substantially only in that specified direction.

The equipment body 120 may be configured for sensitivity to physical phenomena such as such as shock, vibration, etc. The equipment body 120 may comprise any appropriate system for generating a signal in response to changes in position, such as a rate sensing instrument like an inertial measuring unit, a gyroscope, electronic equipment, fragile equipment, and so forth. In the present embodiment, the equipment body 120 comprises a rate sensing instrument. However, the equipment body 120 may comprise any appropriate system. Features of the equipment body 120 such as mass, moments of inertia, center of gravity, and principle axes are taken into account when selecting the appropriate elastic elements 140.

The equipment body 120 may be coupled to other elements such as a control system. For example, the equipment body 120 may be configured to generate a signal in response to movement of the equipment body 120 from its initial position. Such a signal may correspond to a specified movement of the equipment body 120, such as acceleration, velocity, and/or displacement along and/or about a specified axis, and the like. These signals may be processed via a component of the equipment body 120 like a microprocessor or transmitted such as via wires to remote processors. In the present embodiment, the equipment body 120 provides information about the system to which it is attached, in this case a projectile. Accordingly, the equipment body 120 may be configured to determine metrics about the trajectory of the projectile. For example, in response to such metrics, the trajectory of the projectile may be determined and/or modified in a specified manner.

The adapter plate 130 may be configured in various embodiments to operate as an intermediary connecting device between components. The adapter plate 130 may comprise any system for joining elements including, as examples, as a piece of material having a threaded geometry and configured to receive fasteners thereby, a distinct portion of another structure, multiple pieces configured to affix structures together, etc. Referring to FIG. 1 in the present embodiment the adapter plate 130 is configured to couple to the equipment body 120 to the mounting flange 110 and a ballast weight 150. Specifically, the equipment body 120 connects to one face of the adapter plate 130 and another face of the adapter plate 130 attaches to the ballast weight 150 via one or more retainers. Further, by disposing the mounting flange 110 between the ballast weight 150 and the adapter plate 130, the mounting flange 110 may be coupled in response to coupling of the ballast weight 150 to the adapter plate 130.

In one embodiment, the adapter plate 130 comprises a steel slab having dimensions about congruent with those of the bottom face of the equipment body 120. The adapter plate 130 may be configured to couple to the equipment body 120 in any appropriate manner such as a screw, bolt, a compliant displacement limiting device or snubber, an adhesive, and/or the like.

The ballast weight 150 may be configured to adjust the center of gravity and or the moment of inertia of the equipment body 120 relative to the elastic elements 140. The ballast weight 150 may comprise any system for attachment, removable or otherwise. In the present embodiment, the ballast weight 150 comprises a substantially circular piece of material configured to attach to the adapter plate 130 such that the mounting flange 110 and the elastic elements 140 are retained.

The ballast weight 150 may further comprise a snubber 160 configured to engage the mounting flange 110 and limit the strain on the elastic elements 140 during transient events such as the firing of the projectile. The snubber 160 may comprise any system to reduce loading on the elastic elements 140 such as a lip, a shelf, or the like. In the present embodiment, the snubber 160 comprises a plastic washer configured to absorb a portion of the strain that would be applied to the elastic elements 140 during launch.

The mounting flange 110 attaches the isolation system 100 to a larger structure such as a projectile. The mounting flange 110 may comprise any system for securing elements of one system to another system. For example, the mounting flange 110 may be configured to attach the isolation system 100 to a flat or curved surface by use of fasteners such as bolts, screws, adhesives, and the like. In the present embodiment, the mounting flange 110 comprises a steel surface attached to the projectile structure by a mechanical fastener.

Referring again to FIG. 1 of the present embodiment, the isolation system 100 may further comprise three or more elastic elements 140 adapted to act as the isolators. The elastic elements 140 may be configured to provide a specified stiffness so as to respond to phenomena such as vibration, shock, and/or the like in a specified manner. The elastic elements 140 may comprise any system for responding to the relative movement of dynamic events in structures adjoining the elastic element 140 such as flexible rubber pads, metal springs, a dashpot, and the like. In the present embodiment, the elastic element 140 comprises a substantially parallelepiped piece of elastomer. The elastic elements 140 may be configured to couple the equipment body 120 or the adapter plate 130 to a structure such as an interior surface of the projectile in any appropriate manner. For example, the elastic elements 140 may be affixed directly to the projectile and engage the equipment body 120 without the use of the adapter plate 130 or the mounting flange 110.

Figure 2:
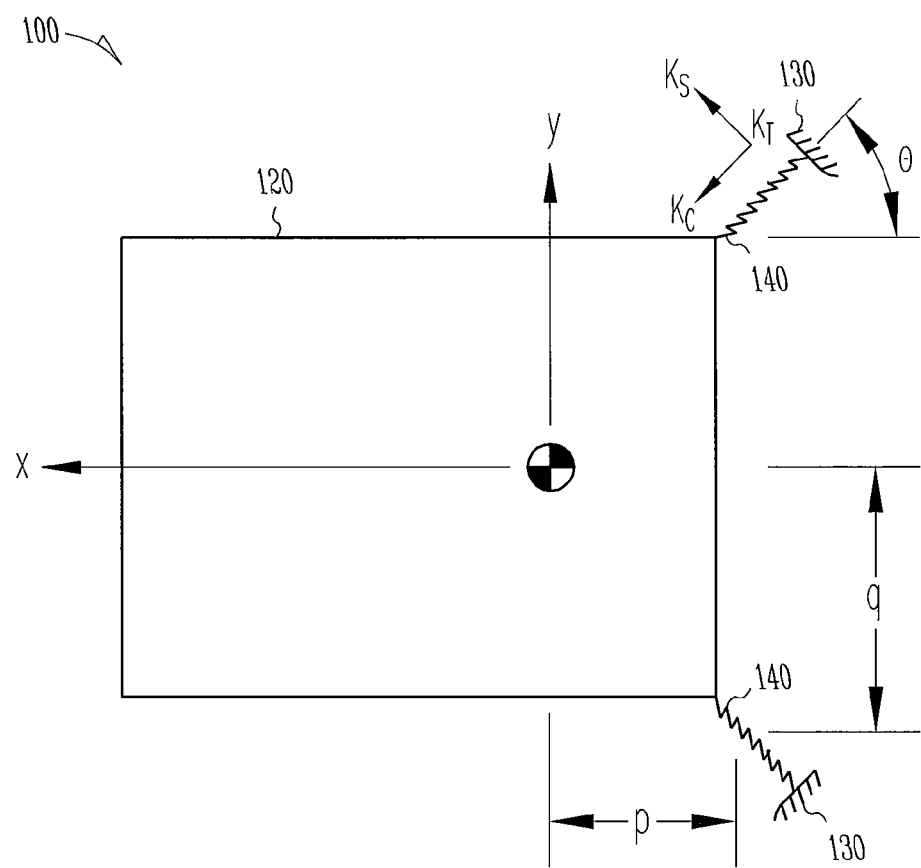
FIG. 2 representatively illustrates one exemplary approach for modeling an elastic element in accordance with the present invention.

The elastic elements 140 may be configured to respond to physical environmental phenomena such as shock, vibration, and/or the like in various embodiments. Referring now to FIG. 2, the elastic elements 140 may be mathematically modeled in an isolation system 100, comprising one or more elastic elements 140 coupled between the equipment body 120 and the adapter plate 130. In one exemplary embodiment, the stiffness of the elastic elements 140 may be represented, as second rank tensors or matrices. Using this format the following equilibrium equation is formed:

$$\begin{bmatrix} F_t \\ F_r \end{bmatrix} = \begin{bmatrix} K_{tt} & K_{tr} \\ K_{rt} & K_{rr} \end{bmatrix} \begin{bmatrix} \delta_t \\ \delta_r \end{bmatrix},$$

where $F_t$ and $F_r$ are the reaction forces and moments to an imposed set of translations, $\delta_t$, and rotations, $\delta_r$. It will be convenient to partition the 6×6 stiffness matrix into sub-matrices. Therefore $K_{tt}$ is a 3×3 stiffness sub-matrix relating the body forces to the applied displacements, $K_{rr}$ is a 3×3 stiffness sub-matrix relating body moments to the applied rotations. The coupling matrix $K_{rt}$ is a 3×3 stiffness sub-matrix relating body moments to the applied displacements, and $K_{tr}$ is a 3×3 stiffness sub-matrix relating forces to the applied rotations. Each of these sub-matrices have different units; this makes accurate comparison of the relative magnitude to these terms less than straight forward.

In order to provide an isoelastic response, the system of elastic elements 140 may be configured such that the diagonal terms of $K_{tt}$ are substantially the same. This is the dominant use of the term "isoelastic" in the literature. This condition, when combined with a geometry that decouples the modes, provides an isolation system that has substantially the same natural frequencies in all three translational axes, X, Y, and Z. The angle at which the relevant isolators are positioned is called the isoelastic angle. This angle is measured relative to the axis of symmetry of the isolation system; it is this angle, along with the individual isolator stiffness properties, that create the isoelastic condition. There may be multiple isoelastic angles when multiple sets of isolators are used. Each set, or related group, of isolators can be combined, using the principle of superposition, to provide an isoelastic system. Each set, or group, of isolators need only to meet, independently, the symmetry requirements specified in the method. These isolators will be referred to as the isoelastic elastic elements 140 in the method.

Figure 3:
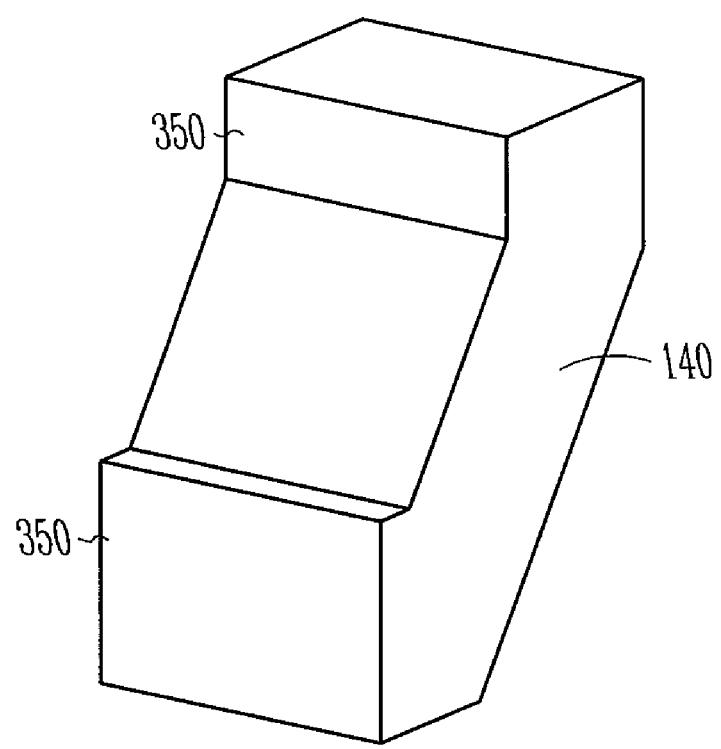
FIG. 3 representatively illustrates an augmentation isolator.

Of less frequent use but sometimes necessary, the rotational natural frequencies need to be the same as the translational. That is, the diagonal terms of $K_{rr}$, when divided by the corresponding second moment of mass (mass moment of inertia) of the isolated body, can be made substantially the same by proper placement and orientation of isolators. This condition, when combined with a geometry that decouples the modes, provides an isolation system that has substantially the same natural frequencies in all three translational axes, X, Y, and Z and all three rotational axes, α, β, and γ. Referring now to FIG. 3, in order to achieve this result, additional isolators, augmentation isolators 350, may be required when the geometry is restricted. The augmentation isolators 350 will augment the primary elastic elements 140 and can be at angles different than the isoelastic angle(s). These augmentation isolators 350 may also be used to provide increased stability of a base mounted system.

Figure 4:
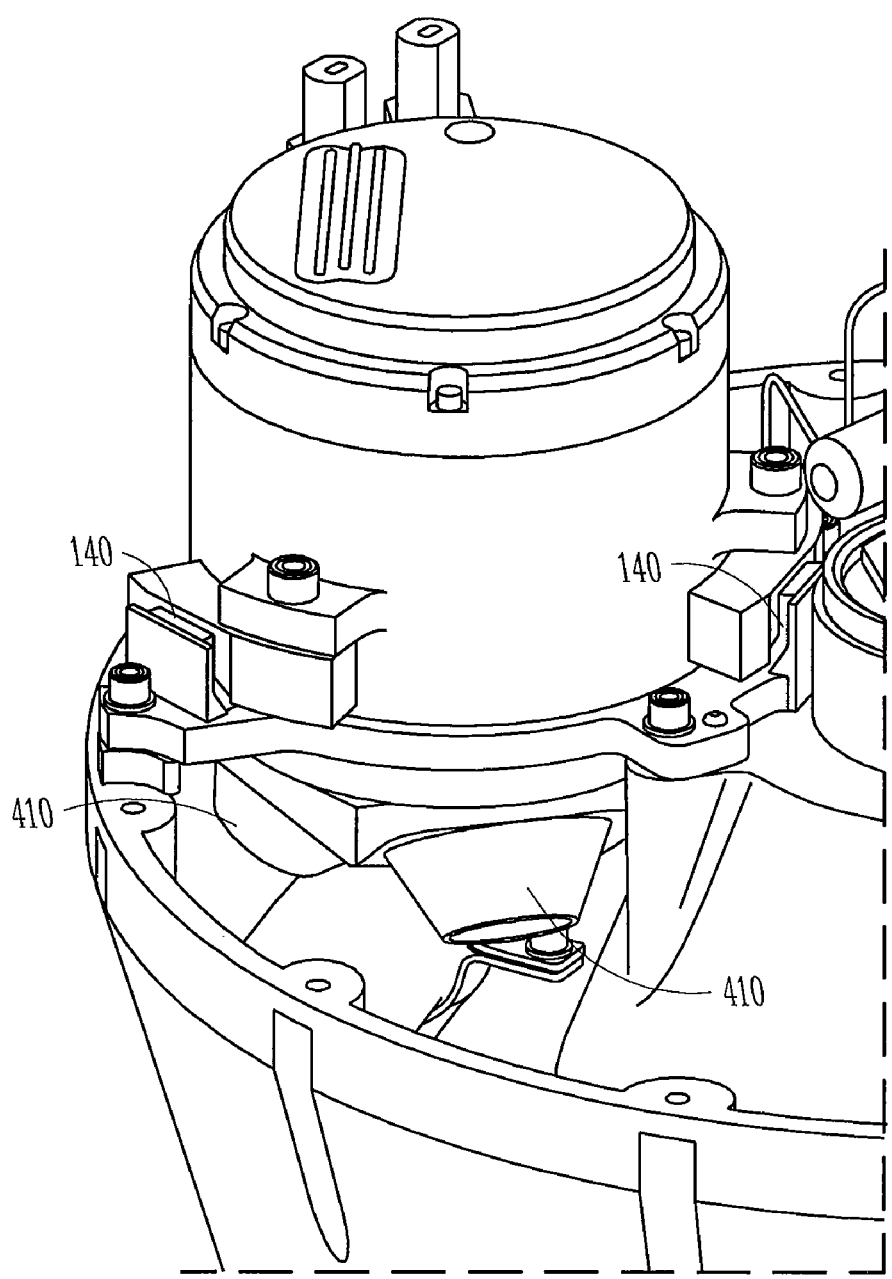
FIG. 4 representatively illustrated a torsional isolator.

Also of less frequent use but sometimes necessary, the rotational natural frequencies need to be substantially higher than the translational modes. Referring now to FIG. 4, this may be achieved by augmenting the isoelastic system with torsional isolators 410 that have low translational stiffness, relative to the isoelastic elastic elements 140, but possessing very high rotational stiffness relative the complete isolation system. In one embodiment the torsional isolators 410 may comprise a set of metal or epoxy graphite composite bellows may be used with elastomeric pads. These elements need only form an orthogonal triad to achieve the desired result. The desired result being high rotational natural frequencies but not substantially affecting the translational isoelastic nature of the system. It is even possible that only a single preferred axis need be affected; resulting in a need for just a single isolator with high rotational stiffness.

In order to provide a modally decoupled response, the system of isolators 140, 350, 410, may be configured such that the body responds to base, such as the mounting flange 110, translations only in the direction of such translations and base rotations only in the direction of such rotations. Accordingly, the $K_{rt}$ and $K_{tr}$ and the diagonal elements of $K_{rt}$ and $K_{rr}$ must be small compared to the other terms in the isolation system stiffness matrix, taking into account the different units of the terms.

The force/displacement equilibrium equation may be written in detail to describe the forces, $F_i$, applied to the equipment body 120 by the elastic elements 140, in response to a set of specified displacements, $\delta_i$: of the equipment body 120, where $F_x$, $F_y$, and $F_z$ are translational forces in the X, Y, and Z directions, $$\begin{bmatrix} F_x \\ F_y \\ F_z \\ F_\alpha \\ F_\beta \\ F_\gamma \end{bmatrix} = \begin{bmatrix} K_{xx} & K_{xy} & K_{xz} & K_{x\alpha} & K_{x\beta} & K_{x\gamma} \\ K_{yx} & K_{yy} & K_{yz} & K_{y\alpha} & K_{y\beta} & K_{y\gamma} \\ K_{zx} & K_{zy} & K_{zz} & K_{z\alpha} & K_{z\beta} & K_{z\gamma} \\ K_{\alpha x} & K_{\alpha y} & K_{\alpha z} & K_{\alpha\alpha} & K_{\alpha\beta} & K_{\alpha\gamma} \\ K_{\beta x} & K_{\beta y} & K_{\beta z} & K_{\beta\alpha} & K_{\beta\beta} & K_{\beta\gamma} \\ K_{\gamma x} & K_{\gamma y} & K_{\gamma z} & K_{\gamma\alpha} & K_{\gamma\beta} & K_{\gamma\gamma} \end{bmatrix} \begin{bmatrix} \delta_x \\ \delta_y \\ \delta_z \\ \delta_\alpha \\ \delta_\beta \\ \delta_\gamma \end{bmatrix}$$

respectively, $F_\alpha$, $F_\beta$, $F_\gamma$ are rotational forces, i.e., moments, about the X, Y, and Z axes, respectively; and $\delta_x$, $\delta_y$, and $\delta_z$ are deflections in the X, Y, and Z directions, respectively, and $\delta_\alpha$, $\delta_\beta$, $\delta_\gamma$ are deflections about the X, Y, and Z axes, respectively. For example, a body displacement of $\delta_y$, with all other displacements being zero, results in a force vector of;

$$\begin{bmatrix} F_x \\ F_y \\ F_z \\ F_\alpha \\ F_\beta \\ F_\gamma \end{bmatrix} = \begin{bmatrix} K_{xy}\delta_y \\ K_{yy}\delta_y \\ K_{zy}\delta_y \\ K_{\alpha y}\delta_y \\ K_{\beta y}\delta_y \\ K_{\gamma y}\delta_y \end{bmatrix}$$

With regard to the model depicted in FIG. 2, the element stiffness matrix for each elastic element 140 may be described by the equations:

$$K_i = \begin{bmatrix} K_S & 0 & 0 & 0 & 0 & 0 \\ 0 & K_t & 0 & 0 & 0 & 0 \\ 0 & 0 & K_C & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix} = \begin{bmatrix} K_S & 0 & 0 & 0 & 0 & 0 \\ 0 & b \cdot K_S & 0 & 0 & 0 & 0 \\ 0 & 0 & a \cdot K_S & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix},$$

where $$b = \frac{K_t}{K_s},$$

the ratio of tangential to shear stiffness of the isolator, and $$a = \frac{K_C}{K_S},$$

the ratio of compression to shear stiffness of the isolator. Without loss of generality, due to the transformation properties of the stiffness matrix, the rotational stiffness terms of the individual terms may be ignored. In practice these terms are usually very small compared to the assembled terms due to typical geometry and material properties of the isolators.

Translation of the $i^{th}$ elastic element 140 a distance q, r, and s in the x, y, and z directions, respectively, yields the translational transformation matrix, $T_i$:

$$T_i = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & -s_i & r_i & 1 & 0 & 0 \\ s_i & 0 & -q_i & 0 & 1 & 0 \\ -r_i & q_i & 0 & 0 & 0 & 1 \end{bmatrix}.$$

Rotations of $\psi$, $\theta$, and $\phi$ about the x, y and z axes, respectfully, yields the Euler transformations. $R_\psi$, $R_\theta$, and $R_\phi$:

$$R_\psi = \begin{bmatrix} 1 & 0 & 0 & 0 & 0 & 0 \\ 0 & \cos(\psi) & \sin(\psi) & 0 & 0 & 0 \\ 0 & -\sin(\psi) & \cos(\psi) & 0 & 0 & 0 \\ 0 & 0 & 0 & 1 & 0 & 0 \\ 0 & 0 & 0 & 0 & \cos(\psi) & \sin(\psi) \\ 0 & 0 & 0 & 0 & -\sin(\psi) & \cos(\psi) \end{bmatrix},$$

$$R_\theta = \begin{bmatrix} \cos(\theta) & 0 & -\sin(\theta) & 0 & 0 & 0 \\ 0 & 1 & 0 & 0 & 0 & 0 \\ \sin(\theta) & 0 & \cos(\theta) & 0 & 0 & 0 \\ 0 & 0 & 0 & \cos(\theta) & 0 & -\sin(\theta) \\ 0 & 0 & 0 & 0 & 1 & 0 \\ 0 & 0 & 0 & \sin(\theta) & 0 & \cos(\theta) \end{bmatrix}, \text{ and}$$

$$R_\varphi = \begin{bmatrix} \cos(\varphi) & \sin(\varphi) & 0 & 0 & 0 & 0 \\ -\sin(\varphi) & \cos(\varphi) & 0 & 0 & 0 & 0 \\ 0 & 0 & 1 & 0 & 0 & 0 \\ 0 & 0 & 0 & \cos(\varphi) & \sin(\varphi) & 0 \\ 0 & 0 & 0 & -\sin(\varphi) & \cos(\varphi) & 0 \\ 0 & 0 & 0 & 0 & 0 & 1 \end{bmatrix},$$

with the complete rotation matrix. $R_i$, described by: $R_i = R_\psi \cdot R_\theta \cdot R_\varphi$.

With these transformation equations, the elastic element 140 may be described in terms of its material properties. Specifically, the elastic element 140 may be designed from a material that provides a specified reaction in response to various physical phenomena including mechanical waves. For example, the similarity transformation, $Q_i$, for the elastic element 140 when subject to displacements of q, r, and s in the x, y, and z directions and rotations of $\psi$, $\theta$, and $\phi$ about the x, y, and z axes, may be described by: $Q_i = T_i \cdot R_i$.

In the present embodiment, three or four elastic elements 140 are employed to isolate the equipment body 120. It further shown that any number of elastic elements 140 may be used and may form separate planes. In terms of the similarity transformation, the stiffness of each elastic element 140 may defined by the equations: $K'_n = Q_n \cdot K_n \cdot [Q_n]^T$ for the similarity transformation matrix of the stiffness K of the nth elastic element 140, $K'_{n+1} = Q_{n+1} \cdot k_{n+1} \cdot [Q_{n+1}]^T$ for the similarity transformation matrix of stiffness K the n+1th elastic element 140, etc., where the resultant stiffness matrix, $K_T$, is: $K_T = K'_n + K'_{n+1} + \ldots$ using the principal of superposition. By specifying a desired response and solving for a, b, and the angle A both suitable materials and a suitable angular relationship for the elastic elements 140 may be established to achieve the desired response.

For example, the resultant stiffness matrix $K_T$ for three elastic elements 140 may be described by the equation $K_T = K'_1 + K'_2 + K'_3$, where $K'_1$, $K'_2$, and $K'_3$ are the similarity transformation matrix of the stiffness K of the first, second, and third elastic element 140, respectively. To achieve isoelasticity, the diagonal terms in the stiffness matrix, $K_{xx}$, $K_{yy}$, and $K_{zz}$ must be substantially equal, meaning that the elastic elements 140 provide a substantially uniform stiffness in all translational degrees of freedom. To achieve the elastic center condition and in view of the symmetry of the system, for example, in the case of an even number of elastic elements 140, the off-diagonal 3×3 sub-matrix terms must be substantially zero. These coupling terms can be made to be small with respect to the diagonal terms if the elastic elements 140 are placed at specific locations and at specific angular orientations. With these terms substantially zero, a displacement in the X, Y, or Z direction will not cause a moment, $F_\alpha$, $F_\beta$, or $F_\gamma$, to be applied to the system. This absence of applied moment is equivalent to the dynamic condition that a translation of the foundation will not result in a rotational motion of the isolated item. Because of symmetry, the diagonal terms will much larger than the off-diagonal, or coupling terms of the system stiffness matrix. For example, a theoretical perfectly manufactured system would have zero for these terms.

Figure 5:
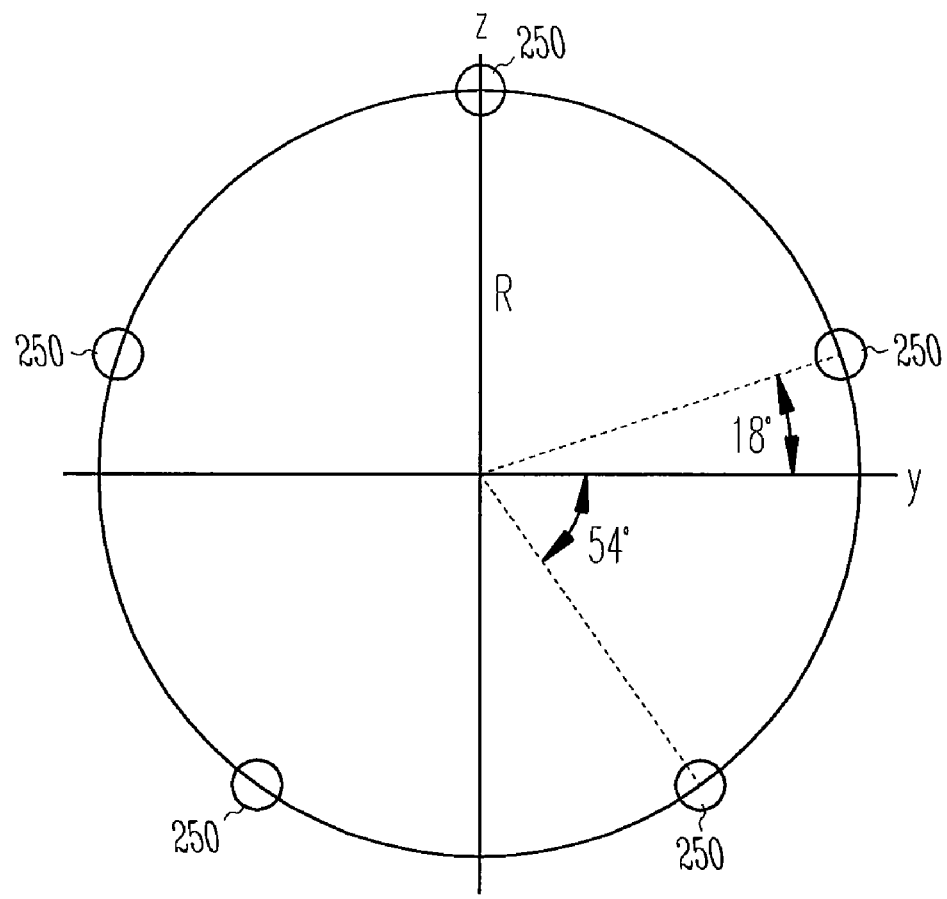
FIG. 5 representatively illustrates another exemplary approach using an odd number of elastic elements in accordance with the present invention.

Given the symmetry inherent in an even number of substantially equally spaced elastic elements 140, the symmetry of the system may be reduced to the expression in FIG. 5. It is shown below that a similar expression results for an odd number of elements as well. An isolation system comprising four elements lying in a plane is used for the following example. Similar equations can be formed using the rule of superposition for additional even number of elements.

Referring to FIG. 2, let the compression to shear ration, Kc/Ks, be defined as "a" and the tangential to shear ration. Kt/Ks, be defined as "b." For the condition of isoelastic then Kz=Ky. This provides the isoelastic angle, theta, as $$\cos\theta = \sqrt{\frac{a+b-2}{3-a}}.$$

For b=1, a common occurrence, theta is 54.7 degrees, approximately. Note that because of symmetry Kz=Kx as well, making the system completely isoelastic.

Once the isoelastic angle is known, the location of the center of gravity of the isolated equipment must now be determined. Solving the equation for the remaining three degrees of freedom by choosing p and q to make the coupling term $K_T(2,3)$, zero provides the equation:

$$\frac{p}{q} = \frac{\sqrt{(-1+a)(1-2a+b)(-2+a+b)}}{2(1+a+b)\sqrt{(1-a)}}.$$

For the elastic element 140 having material properties in which b=1, that is, for the elastic element 140 having the equivalent shear and tangential stiffnesses, the equation resolves to:

$$\frac{p}{q} = \frac{-1+a}{\sqrt{2}(2+a)}.$$

In summary, for an even number of elastic elements 140 arranged substantially symmetrically about the isolator, the material properties of elastic elements 140 providing a base-mounted, isoelastic, modally decoupled isolation system may be solved analytically. One such solution is provided above.

Figure 8A:
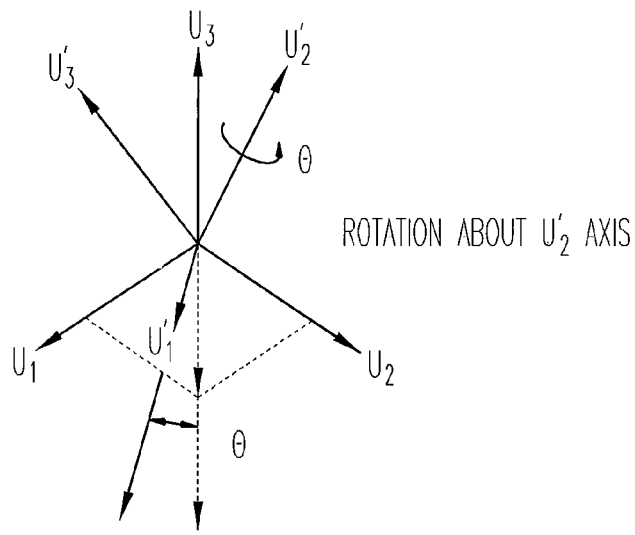
FIG. 8 demonstrates the calculation of rotation angles in a three dimensional space.
Figure 8B:
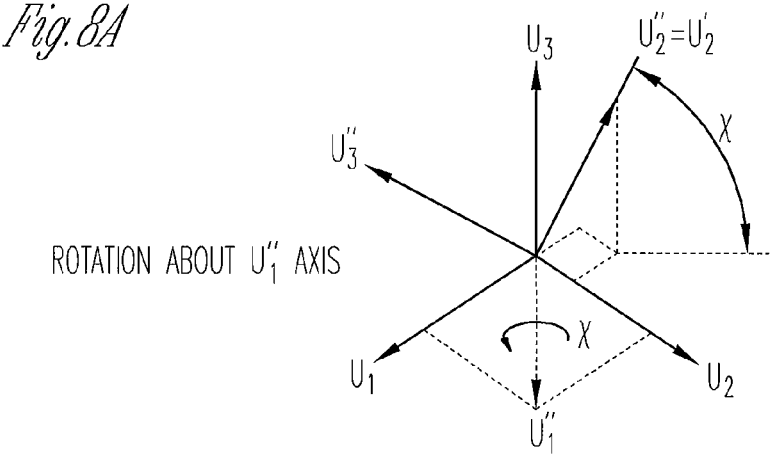
Figure 8C:
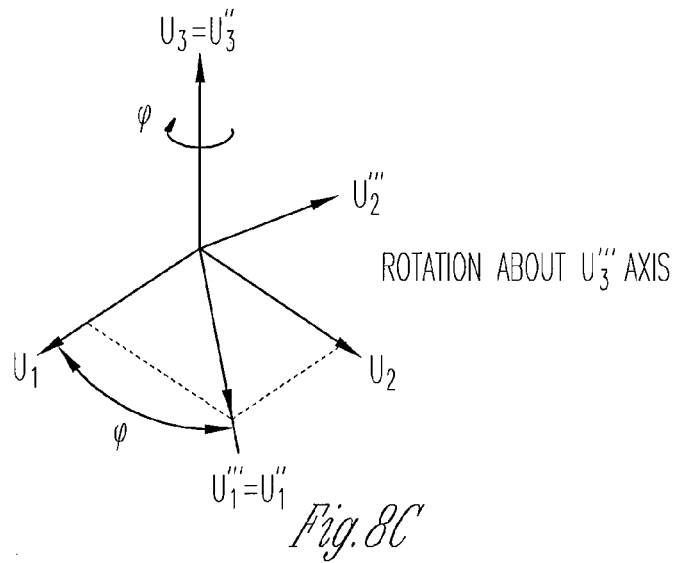

On the other hand, for systems comprising odd numbers of elastic elements 140, the symmetry argument available in the case of even numbered is not available. Referring now to FIG. 5, a system comprising an odd number of evenly spaced elastic elements 140 about a circle may be considered relative to a coordinate system X, Y, and Z. For a given odd number (N) of elastic elements 140, the isoelastic angle, theta, is found in the same manner as for an even number of isolators. Isoelasticity is shown by the following:

If N=3, elastic element number 3 has only the tangential stiffness in the y-direction while isolators 1 and 2 have each. To show that the moment about the Z axis is zero for a displacement in the Y axis, the tensor transformation of the stiffness matrix at the isolators must be employed. From symmetry, a displacement in the X direction will result in a zero moment about the Z axis. Thus the stiffness matrix for each isolator becomes as shown in FIG. 7. Where the $k_{ij}$ are the elements of the rotated isolator matrix and the $p_i$ are the X, Y, and Z location of the isolator, i.e., the stiffness for a single spring located at $$\begin{Bmatrix} p_1 \\ p_2 \\ p_3 \end{Bmatrix}$$

with a stiffness matrix referenced to the local system $$[k] = [R][k^1][R]^T = \begin{bmatrix} k_{11} & k_{12} & k_{13} & & & \\ k_{21} & k_{22} & k_{23} & & 0 & \\ k_{31} & k_{32} & k_{33} & & & \\ & & & k_{44} & k_{45} & k_{46} \\ & 0 & & k_{54} & k_{55} & k_{56} \\ & & & k_{64} & k_{65} & k_{66} \end{bmatrix}$$

where the Euler angle rotation matrix, $R_1$, is defined as follows:

$$[V] \equiv \begin{bmatrix} \cos\theta\cos\phi + \sin\phi\sin\theta\sin\psi & \cos\psi\sin\phi & \cos\theta\sin\psi\sin\phi - \cos\phi\sin\theta \\ \cos\phi\sin\theta\sin\psi - \cos\theta\sin\phi & \cos\psi\cos\phi & \cos\theta\cos\phi\sin\psi + \sin\theta\sin\phi \\ \cos\psi\sin\theta & -\sin\psi & \cos\theta\cos\psi \end{bmatrix}$$

the rotation angles are defined as shown in FIG. 8, and $$[R] = \begin{bmatrix} v & 0 \\ \hline 0 & v \end{bmatrix}$$

Without loss in generality, the individual rotational stiffness sub matrix can be set to zero. It can then be demonstrated that a displacement in the y direction will result in a zero moment about the Z necessarily yielding the equation $$F_Y = 0 = \sum_i k_{62}^i \delta y$$

which becomes $$\sum_i -k_{12}^{-i} p_2^i + k_{22}^{-i} p^i = 0,$$

where $p_1^i = R\cos\phi_i$ and $p_2^i = R\sin\phi_i$. Then multiplying out the matrix terms and using the definition of [R] the following results:

$$k_{12}^i = -\cos\phi_i \cos\theta \sin\theta K_S + \cos\phi_i^2 K_T - \cos\phi_i \sin\phi \sin\theta^2 K_C \text{ and,}$$

$$k_{22}^i = (\sin\phi_i \cos\theta)^2 K_S + \cos\phi_i^2 K_T + (\sin\phi_i \sin\theta)^2 K_C$$

The $K_C$, $K_S$, and $K_T$ can be combined to give three conditions that must be met if the system is to be free of a moment about the Z axis:

$$K_S \text{ term} = \sum_i (\sin\phi_i^2 \cos\phi_i^2 - \sin\phi_i^2 \cos\phi_i)\cos\theta^2 = 0;$$

$$K_T \text{ term} = \sum_i \cos\phi_i(\sin^2\phi_i + \cos^2\phi_i) = 0; \text{ and}$$

$$K_C \text{ term} = \sum_i (\sin^2\phi_i \cos\phi_i - \sin^2\phi_i \cos\phi_i)\sin^2\theta = 0$$

By inspection the $K_S$ and $K_C$ terms vanish and all that must be shown is that the $K_T$ term vanishes; i.e., $$0 = \sum_{M=1}^{N} \cos\left(\frac{M*2*\pi}{N}\right),$$

where N gives the number of elastic elements 140 in the system 100 and M takes the values indicated by the sum, i.e., 1, 2, . . . N and N is 2 or greater. The method of proving this equation for all N>2 is via mathematical induction; i.e., the equation is shown to be true for a stalling value, then assuming the equation is true for N, and then showing that the equation is true for N+1.

The starting value is N=2, and it is cleat that $0=\cos(\pi)+\cos(2\pi)=-1+1$. It is left to show that $$0 = \sum_{M=1}^{N+1} \cos\left(\frac{M*2*\pi}{N+1}\right).$$

This is straight forward since N is a dummy index, i.e., N+1 can be replaced by K, giving;

$$0 = \sum_{M=1}^{K} \cos\left(\frac{M*2*\pi}{K}\right),$$

resulting in the relationship which was to be shown.

Figure 6:
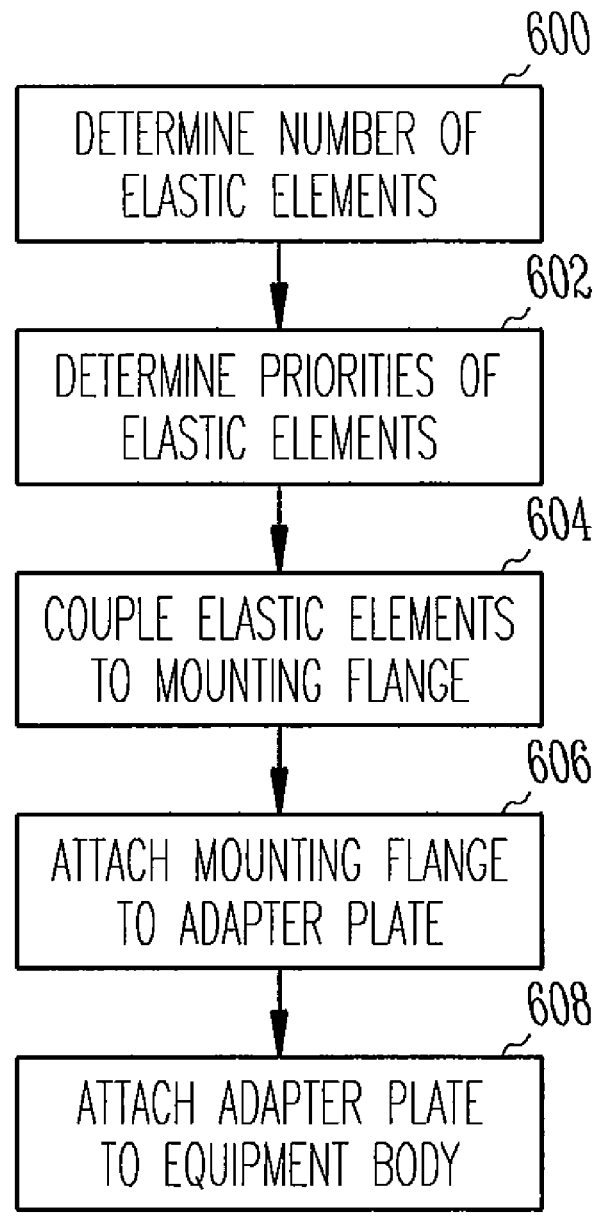
FIG. 6 representatively illustrates a flowchart for operation of an isolation system in accordance with the present invention.

The present system 100 may be implemented to achieve a base-mounted, isoelastic, modally decoupled SVIS. The elastic elements 140 may impede the transfer of mechanical shock and vibration in any appropriate manner, such as through inherent material characteristics, through arrangement in conjunction with a mounting flange 110, according to a specified design approach, etc. Referring to FIG. 6 of the present embodiment, a specified number of elastic elements 140 is determined (600). Material properties related to the desired isolation properties of the elastic elements 140 may be determined (602). The elastic elements 140 may be coupled with the mounting flange 110 (604). The mounting flange 110 may be attached to the adapter plate 130 (606). The adapter plate 130 may be further attached to the equipment body 120 (608).

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition, or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A shock and vibration isolation system for mounting an equipment body to a structure, comprising:
a plurality of elastic elements to couple the equipment body to the structure, the plurality of elastic elements disposed in a plane around a planar base of the equipment body and asymmetric about a center of gravity of the equipment body with the plane in which the elastic elements are disposed located away from a center of gravity of the equipment body,
wherein each of the plurality of elastic elements faces the equipment body at an isoelastic angle at which each of the plurality of elastic elements has a substantially uniform stiffness along three translational degrees of freedom, and a center of elasticity of the plurality of elastic elements is arranged substantially coincident with the center of gravity of the equipment body to decouple a first vibrational mode of the equipment body along a first axis from a second vibrational mode along a second axis other than the first axis, with a vibrational response of the equipment body isoelastic with respect to the structure when the equipment body is mounted to the structure.

2. A shock and vibration isolation system according to claim 1, further comprising augmentation isolators to couple the equipment body to the structure, the augmentation isolators having a further predetermined stiffness, the augmentation isolators arranged with respect to the equipment body so that at least one rotational natural frequency of the equipment body with respect to the structure is the same as at least one translational natural frequencies of the equipment body with respect to the structure when mounted to the structure.

3. A shock and vibration isolation system according to claim 2, wherein the augmentation isolators are oriented at a respective isoelastic angle relative to the equipment body when mounted to the structure.

4. A shock and vibration isolation system according to claim 1, further comprising at least one torsional isolator coupled to the equipment body, wherein the at least one torsional isolator is configured to resist rotational movement in relation to the equipment body when mounted to the structure.

5. A shock and vibration isolation system according to claim 1, further comprising an adapter plate, wherein the adapter plate is disposed between the plurality of elastic elements and the equipment body.

6. A shock and vibration isolation system according to claim 5, wherein the adapter plate further comprises a ballast weight configured to adjust the center of gravity and moment of inertia of the equipment body relative to the plurality of elastic elements.

7. The shock and vibration isolation system of claim 1, wherein the equipment body includes a rate sensing instrument, and further comprising:
an adapter plate coupled to the equipment body and the plurality of elastic elements; and a mounting flange coupled to the adapter plate and the plurality of elastic elements, the mounting flange adapted to attach to the structure, with the plurality of elastic elements coupled between the mounting flange and an adaptor plate.

8. A shock and vibration isolation system according to claim 7, wherein the adapter plate further comprises a snubber configured to engage the mounting flange, wherein the snubber is configured to limit displacement of the equipment body.

9. A shock and vibration isolation system according to claim 7, wherein the adapter plate further comprises a ballast weight configured to adjust the center of gravity and moment of inertia of the equipment body relative to the elastic elements.

10. A shock and vibration isolation system according to claim 7, further comprising at least one torsional isolator, wherein the at least one torsional isolator is configured to resist rotational movement in relation to the equipment body.

11. A shock and vibration isolation system for a rate sensing instrument in a projectile, comprising:
a plurality of elastic elements configured in a plane around and adapted to engage the rate sensing instrument, wherein the plurality of elastic elements are:
asymmetric about a center of gravity of the rate sensing instrument such that a center of elasticity of the sensing instrument is located at a center of gravity of the sensing instrument; and
configured to decouple a vibrational mode along a first axis from a vibrational mode along a second axis;
a mounting flange adapted to attach to the projectile, wherein the mounting flange houses the plurality of elastic elements; and
an adapter plate disposed between the rate sensing instrument and the plurality of elastic elements.

12. A shock and vibration isolation system according to claim 11, wherein the plurality of elastic elements are oriented at an isoelastic angle relative the rate sensing instrument.

13. A shock and vibration isolation system according to claim 11, wherein the adapter plate further comprises a ballast weight configured to adjust the center of gravity and moment of inertia of the rate sensing instrument relative to the elastic elements.

14. A shock and vibration isolation system according to claim 11, further comprising at least one torsional isolator, wherein the at least one torsional isolator is configured to resist rotational movement in relations to the sensing instrument.

15. A shock and vibration isolation system according to claim 11, wherein the adapter plate further comprises a snubber configured to engage the mounting flange, wherein the snubber is configured to limit displacement of the rate sensing instrument.

16. A method of isolating a rate sensing instrument in a projectile from shock and vibration, comprising:
determining an appropriate number of elastic elements to mount the sensing instrument to the projectile;
angling each of the elastic elements to face the sensing instrument at an isoelastic angle and selecting a stiffness for each of the elastic elements such that a vibrational response of the rate sensing instrument with respect a further portion of the projectile is isoelastic, with each of the elastic elements having a substantially uniform stiffness along three translational degrees of freedom, wherein a center of elasticity of the elastic elements is substantially at a center of gravity of the sensing instrument to decouple a first vibrational mode of the sensing instrument along a first axis from a second vibrational mode of the sensing instrument along a second axis; and
coupling the elastic elements between the rate sensing instrument and a portion of the projectile in at least one plane, wherein the elastic elements are asymmetric about a center of gravity of the rate sensing instrument with the at least one plane in which the elastic elements are disposed located away from a center of gravity of the sensing instrument.

17. A method of isolating a rate sensing instrument according to claim 16, wherein:
coupling the elastic elements comprises housing the elastic elements in a mounting flange; and
attaching the mounting flange to an adapter plate that is affixed to the rate sensing instrument.

18. A method of isolating a rate sensing instrument according claim 17, further comprising adjusting a center of gravity and a moment of inertia of the rate sensing instrument by altering a position of a ballast weight connected to the adapter plate.

19. A shock and vibration isolation system for mounting an equipment body to a structure, comprising:
a plurality of elastic elements to couple the equipment body to the structure, the plurality of elastic elements configured in a plane and asymmetric about a center of gravity of the equipment body such that a center of elasticity of the equipment body is located at a center of gravity of the equipment body, wherein each of the elastic elements is arranged with respect to the equipment body to decouple a first vibrational mode of the equipment body along a first axis from a second vibrational mode along a second axis other than the first axis, and wherein each of the plurality of elastic elements has a predetermined stiffness such that a vibrational response of the equipment body is isoelastic with respect to the structure when mounted to the structure; and
augmentation isolators to couple the equipment body to the structure, the augmentation isolators having a further predetermined stiffness, the augmentation isolators arranged with respect to the equipment body so that at least one rotational natural frequency of the equipment body with respect to the structure is the same as at least one translational natural frequencies of the equipment body with respect to the structure when mounted to the structure.

20. A shock and vibration isolation system according to claim 19, wherein the augmentation isolators are oriented at a respective isoelastic angle relative to the equipment body when mounted to the structure.

21. A shock and vibration isolation system for mounting an equipment body to a structure, comprising:
a plurality of elastic elements to couple the equipment body to the structure, the plurality of elastic elements configured in a plane and asymmetric about a center of gravity of the equipment body such that a center of elasticity of the equipment body is located at a center of gravity of the equipment body, wherein each of the plurality of elastic elements is arranged with respect to the equipment body to decouple a first vibrational mode of the equipment body along a first axis from a second vibrational mode along a second axis other than the first axis, and wherein each of the plurality of elastic elements has a predetermined stiffness such that a vibrational response of the equipment body is isoelastic with respect to the structure when mounted to the structure;

an adapter plate coupled to the equipment body and the plurality of elastic elements; and a mounting flange coupled to the adapter plate and the plurality of elastic elements, the mounting flange adapted to attach to the structure, with the plurality of elastic elements coupled between the mounting flange and an adaptor plate.

22. A shock and vibration isolation system according to claim 21, wherein the adapter plate further comprises a snubber configured to engage the mounting flange, wherein the snubber is configured to limit displacement of the equipment body.

23. A shock and vibration isolation system according to claim 21, wherein the adapter plate further comprises a ballast weight configured to adjust the center of gravity and moment of inertia of the equipment body relative to the elastic elements.

24. A shock and vibration isolation system according to claim 21, further comprising at least one torsional isolator, wherein the at least one torsional isolator is configured to resist rotational movement in relation to the equipment body.

25. A method of isolating a rate sensing instrument in a projectile from shock and vibration, comprising:

determining an appropriate number of elastic elements necessary to decouple vibrations in a first axis from a second axis;

selecting a stiffness for each of the elastic elements such that a vibrational response of the rate sensing instrument with respect a further portion of the projectile is isoelastic;

coupling the elastic elements between rate sensing instrument and a portion of the projectile in at least one plane, wherein the elastic elements are asymmetric about a center of gravity of the rate sensing instrument such that a center of elasticity of the sensing instrument is at a center of gravity of the sensing instrument, wherein coupling the elastic elements to the rate sensing instrument comprises housing the elastic elements in a mounting flange; and attaching the mounting flange to an adapter plate that is affixed to the rate sensing instrument.

26. A method of isolating a rate sensing instrument according claim 25, further comprising adjusting a center of gravity and a moment of inertia of the rate sensing instrument by altering a position of a ballast weight connected to the adapter plate.

* * * * *

UNITED STATES PATENT AND TRADEMARK OFFICE
CERTIFICATE OF CORRECTION

| | | |
|---|---|---|
| PATENT NO. | : 7,883,071 B2 | Page 1 of 1 |
| APPLICATION NO. | : 12/266159 | |
| DATED | : February 8, 2011 | |
| INVENTOR(S) | : Gary L. Fox et al. | |

It is certified that error appears in the above-identified patent and that said Letters Patent is hereby corrected as shown below:

In column 1, line 49, delete "First" and insert -- First, --, therefor.

In column 3, line 3, delete "phenomena," and insert -- phenomena --, therefor.

In column 3, lines 66-67, delete "embodiments" and insert -- embodiments, --, therefor.

In column 8, line 53, delete "additional" and insert -- additional, --, therefor.

In column 8, line 56, delete "ration." and insert -- ration, --, therefor.

In column 11, line 2, delete "stalling" and insert -- starting --, therefor.

In column 11, line 5, delete "cleat" and insert -- clear --, therefor.

In column 11, line 66, delete "composition," and insert -- composition --, therefor.

Signed and Sealed this
Third Day of May, 2011

David J. Kappos
*Director of the United States Patent and Trademark Office*